United States Patent
Gray et al.

(10) Patent No.: US 8,418,196 B2
(45) Date of Patent: Apr. 9, 2013

(54) INTERACTIVE CONTENT WITH ENHANCED NETWORK OPERATOR CONTROL

(75) Inventors: James Harold Gray, Ellijay, GA (US); Thomas Jefferson Brothers, Gainesville, GA (US); Willilam Randolph Matz, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3028 days.

(21) Appl. No.: 10/611,454

(22) Filed: Jun. 30, 2003

(65) Prior Publication Data

US 2004/0268418 A1 Dec. 30, 2004

(51) Int. Cl.
| | |
|---|---|
| *H04N 7/10* | (2006.01) |
| *H04N 7/025* | (2006.01) |
| *H04N 5/445* | (2006.01) |
| *H04N 7/173* | (2011.01) |
| *G06F 3/00* | (2006.01) |
| *G06F 13/00* | (2006.01) |

(52) U.S. Cl.
USPC ............. 725/32; 725/40; 725/51; 725/112

(58) Field of Classification Search ............. 725/37–38, 725/46, 58–61
See application file for complete search history.

(56) References Cited

U.S. PATENT DOCUMENTS

| | | | |
|---|---|---|---|
| 3,798,610 A | 3/1974 | Bliss et al. | |
| 3,886,302 A | 5/1975 | Kosco | |
| 4,130,833 A | 12/1978 | Chomet | |
| 4,258,386 A | 3/1981 | Cheung | |
| 4,264,925 A | 4/1981 | Freeman et al. | |
| 4,361,851 A | 11/1982 | Asip et al. | |
| 4,488,179 A | 12/1984 | Kruger et al. | |
| 4,566,030 A | 1/1986 | Nickerson et al. | |
| 4,567,591 A | 1/1986 | Gray et al. | |
| 4,573,072 A | 2/1986 | Freeman | |
| 4,598,288 A | 7/1986 | Yarbrough et al. | |
| 4,688,248 A | 8/1987 | Tomizawa | |
| 4,689,661 A | 8/1987 | Barbieri et al. | |
| 4,698,670 A | 10/1987 | Matty | |
| 4,720,873 A | 1/1988 | Goodman et al. | |
| 4,816,904 A | 3/1989 | McKenna et al. | |

(Continued)

FOREIGN PATENT DOCUMENTS

WO    WO-9414284    6/1994

OTHER PUBLICATIONS

Zap2it.com: "TV Listings Frequently Asked Questions" http://web.archive.org/web/20000903002526/www.zap2it.com/index/1,1146,4_I_0_000,FF.html Sep. 6, 2000.*

(Continued)

*Primary Examiner* — Bennett Ingvoldstad
(74) *Attorney, Agent, or Firm* — Toler Law Group, PC (57) ABSTRACT

A method and apparatus are described that provide enhanced network operator control. According to one aspect of the present invention, a method comprises determining at a head-end and data center whether to inform one or more users of an interactive television service of available content, the one or more users connected with head-end and data center via a network. Responsive to determining to inform the one or more users of the available content, generating a hot key signal indicating availability and a location of the alternate content. The hot key signal is inserted into a content signal transmitted to the one or more users from the head-end and data center via the network.

21 Claims, 7 Drawing Sheets

U.S. PATENT DOCUMENTS

| | | |
|---|---|---|
| 4,862,268 A | 8/1989 | Campbell et al. |
| 4,890,322 A | 12/1989 | Russell, Jr. |
| 4,912,552 A | 3/1990 | Allison, III et al. |
| 5,010,585 A | 4/1991 | Garcia |
| 5,010,858 A | 4/1991 | Schierling et al. |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,161,019 A | 11/1992 | Emanuel |
| 5,173,900 A | 12/1992 | Miller et al. |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | Von Kohorn |
| 5,260,778 A | 11/1993 | Kauffman et al. |
| 5,262,860 A | 11/1993 | Fitzpatrick et al. |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,390,027 A | 2/1995 | Henmi et al. |
| 5,404,393 A | 4/1995 | Remillard |
| 5,444,499 A | 8/1995 | Saitoh |
| 5,446,490 A | 8/1995 | Blahut et al. |
| 5,481,542 A | 1/1996 | Logston et al. |
| 5,483,277 A | 1/1996 | Granger |
| 5,502,499 A | 3/1996 | Birch et al. |
| 5,539,822 A | 7/1996 | Lett |
| 5,557,320 A | 9/1996 | Krebs |
| 5,557,338 A | 9/1996 | Maze et al. |
| 5,585,838 A | 12/1996 | Lawler et al. |
| 5,585,858 A | 12/1996 | Harper et al. |
| 5,608,448 A | 3/1997 | Smoral et al. |
| 5,629,733 A | 5/1997 | Youman et al. |
| 5,640,192 A | 6/1997 | Garfinkle |
| 5,648,824 A | 7/1997 | Dunn et al. |
| 5,661,517 A | 8/1997 | Budow et al. |
| 5,721,829 A | 2/1998 | Dunn et al. |
| 5,779,549 A | 7/1998 | Walker |
| 5,781,246 A | 7/1998 | Alten et al. |
| 5,784,683 A | 7/1998 | Sistanizadeh et al. |
| 5,805,154 A | 9/1998 | Brown |
| 5,822,123 A | 10/1998 | Davis et al. |
| 5,828,420 A | 10/1998 | Marshall et al. |
| 5,847,771 A | 12/1998 | Cloutier et al. |
| 5,867,205 A | 2/1999 | Harrison |
| 5,880,768 A | 3/1999 | Lemmons et al. |
| 5,880,769 A | 3/1999 | Nemirofsky |
| 5,892,508 A | 4/1999 | Howe et al. |
| 5,931,908 A | 8/1999 | Gerba et al. |
| 6,005,561 A | 12/1999 | Hawkins et al. |
| 6,012,983 A | 1/2000 | Walker et al. |
| 6,100,883 A | 8/2000 | Hoarty |
| 6,108,042 A | 8/2000 | Adams et al. |
| 6,113,495 A | 9/2000 | Walker et al. |
| 6,157,413 A | 12/2000 | Hanafee et al. |
| 6,244,957 B1 | 6/2001 | Walker et al. |
| 6,256,785 B1 | 7/2001 | Klappert et al. |
| 6,324,544 B1 | 11/2001 | Alam et al. |
| 6,419,137 B1 | 7/2002 | Marshall et al. |
| 6,463,207 B1 | 10/2002 | Abecassis |
| 6,468,155 B1 | 10/2002 | Zucker et al. |
| 6,502,242 B1 | 12/2002 | Howe et al. |
| 6,567,982 B1 | 5/2003 | Howe et al. |
| 6,634,942 B2 | 10/2003 | Walker et al. |
| 6,676,522 B2 | 1/2004 | Rowe et al. |
| 6,800,029 B2 | 10/2004 | Rowe et al. |
| 6,826,775 B1 | 11/2004 | Howe et al. |
| 6,967,566 B2 | 11/2005 | Weston et al. |
| 7,100,183 B2 | 8/2006 | Kunkel et al. |
| 7,237,253 B1 | 6/2007 | Blackketter et al. |
| 7,266,835 B2 | 9/2007 | Halbert |
| 2001/0054134 A1 | 12/2001 | Nagatomo et al. |
| 2002/0069132 A1 | 6/2002 | Perkes et al. |
| 2002/0138561 A1 | 9/2002 | Chatfield et al. |
| 2002/0147988 A1 | 10/2002 | Nakano |
| 2002/0156870 A1 | 10/2002 | Boroumand et al. |
| 2003/0163828 A1* | 8/2003 | Agnihotri et al. ............. 725/113 |
| 2003/0204847 A1 | 10/2003 | Ellis et al. |
| 2004/0003402 A1 | 1/2004 | McKenna |
| 2004/0049785 A1 | 3/2004 | Grzeczkowski et al. |
| 2004/0168188 A1 | 8/2004 | Bennington et al. |
| 2004/0235567 A1 | 11/2004 | Chatani |
| 2004/0261127 A1 | 12/2004 | Freeman et al. |
| 2005/0086688 A1* | 4/2005 | Omoigui ........................ 725/46 |
| 2005/0114906 A1 | 5/2005 | Hoarty et al. |
| 2005/0196139 A1 | 9/2005 | Blackketter et al. |
| 2005/0204030 A1 | 9/2005 | Koch et al. |
| 2006/0075430 A1 | 4/2006 | Park |
| 2006/0190966 A1 | 8/2006 | McKissick et al. |
| 2007/0107035 A1 | 5/2007 | Howe et al. |
| 2007/0124763 A1 | 5/2007 | Ellis |
| 2007/0136773 A1 | 6/2007 | O'Neil et al. |
| 2007/0155506 A1 | 7/2007 | Malik |
| 2007/0168884 A1 | 7/2007 | Weeks et al. |
| 2007/0186269 A1 | 8/2007 | Malik |
| 2007/0208766 A1 | 9/2007 | Malik |

OTHER PUBLICATIONS

"Building a Switched Broadcast Network", *Access Intelligence LLC* Nov. 15, 2005.

"Building Dynamic Content for Set-Top Boxes.", *Sun Microsystems* 1994-2005.

"Building the Perfect on Demand Beast: Television on Demand Presents a Dizzyling Array of Technology Options.", *Reed Business Information* Nov. 3, 2003.

"Chips: Motorola's Scorpion chip turns TV into interactive information appliance.", *Work Group Computing Report* Aug. 11, 1997.

"Columbia Tri-Star Television Distribution and Microsoft Sponsor Development Competition for Interactive Television.", *Microsoft Press Pass* Jan. 25, 2000.

"EnReach Technology, Inc. Demonstrates Next Generation of Interactive Television with Innovative Open PVR Solution.", *EnReach Technology, Inc. PR Newswire* Sep. 12, 1996-2006.

"Enter Video-On-Demand.", *Electronic news* Aug. 31, 1998.

"Liberate Technologies Completes Assessment Aboard Scientific—Atlanta Explorer Set Tops and Digital Interactive Network.", *Liberate Technologies Press* May 2, 2002.

"Next-Generation Digital Video Network: Intelligent IP Infrastructure Solutions for Cable Operators Offering VoD Servies.", *Reed Business Information* Feb. 2004.

"PBS Debuts Another First in Interactive Television; Wavexpress Selected to Provide Digital Broadcasting Platform.", *Market Wire* Feb. 28, 2001.

"PENTV: BBC Achieves Significant Interactive TV Audiences With Open TV.", Aug. 13, 2001.

"Set-Top Survival.", *Electronics Weekly* May 22, 2002.

"Successfully Marketing Television on Demand: Operators, Programmers Look to Drive VOD Usage Through Promotions, Improved Navigation.", *Reed Business Information* ISSN: 00072028 Nov. 22, 2004.

"Time Warner Introduces World's First Full Service Network in Orlando; Network offers First Digital Interactive Service including Movies on Demand, Home Shopping and Interactive Games.", *Business Wire* Dec. 14, 1994 , 1-3.

"Video on the Move.", *Reed Business Information* Aug. 14, 2000.

"Worldgate Set to Deliver 'Go!TV Links' for Dynamic Interactive TV.", *Advanstar Communications, Inc.* Oct. 22, 2002.

"http:/www.nintendo.com/consumer/downloads/wave_english.pdf".

Berkowitz, Ben "Developers Interacting With Sony Set-Top Box", *Cable Worlds* May 21, 2001.

Bissell, R.A. et al., "The Set-Top Boxes for Interactive Services.", *BT Technology J.* vol. 13 No. 4 Oct. 1995 , 66-77.

Carey, John "Content and Service for the New Digital TV Environment."

Cauley, Leslie "Microsoft, Baby Bell Form Video Alliance.", *The Wall Street Journal* Sep. 26, 1994.

Chorianopoulos, Konstantinos "The Digital Set-Top Box as a Virtual Channel Provider.", *Dept. of Management Science and Technology, Athens University of Economics & Business* Apr. 2003.

Dransfeld, Henning et al., "Interactive TV and Formula One a Strategic Issue for Engine Suppliers", *European Business Review* 1999.

Droitcourt, J.L. "Understanding How Interactive Television Set Top Box Works . . . and What It Will Mean to the Customer", *International Broadcasting Convention* Sep. 14-18, 1995.

Elmer-Dewitt, Phillip "Play . . . Fast Forward . . . Rewind . . . Pause U.S. Firms Want to Wire America for Two-Way TV, but their Systems Are Not Ready for Prime Time.", *Time Archive* May 23, 1994, 1-4.

Elmer-Dewitt, Phillip "Ready for Prime Time?", *Time Archive* Dec. 26, 1995, 1-4.

Grant, Peter "On-Demand TV Expands via Underused Fiber Highways.", *Wall Street Journal* Dec. 17, 2004.

Greenwald, John "Battle for Remote Control.", *Time Archive* Mar. 1, 1995.

Hodge, Winston "Architecture to Deliver Video on Demand.", *Electronic Business Buyer* Nov. 1994.

Jain, Sanjay K. et al., "Video on Demand: An Overview.", *A Central University* Feb. 2003.

Keough, Christopher "Interactive TV Connection-Technology-Gold Pocket Interactive Acquires Mixed Signals Technologies.", *Los Angeles Business Journal* Mar. 4, 2002.

Leban, M. et al., "Internet Search for TV Content Based on TV Anytime.", Sep. 22-24, 2003.

Lin, et al., "The Influence of Network Branding on Audience Affinity for Network Television.", *Advertising Research Foundation* Feb. 2004.

Loizides, "Interactive TV: Dispelling Misconceptions in the Media.", *Acm Computers in Entertainment*, vol. 3, No. 1, Article 7a. Jan. 2005.

Mermigas, Diane "NBC Taking TV's Future by the Reins With On-Demand Content, Delivery.", *Television Week* Sep. 15, 2003.

Short, David "A Quick Guide to Interactive Television.", *Broadcasting Engineering* Feb. 2005.

Srivastava, H.O. et al., "On-Line Broadcast Archives for Interactive Video.", 1997.

Verhoeven, Jan L. et al., "System Architecture for Experimental Interactive Television.", *LogicaCMG Nederland B.V.*

Waterman, David "Internet TV: Business Models and Program Content.", *Dept. of Telecommunications Radio and TV Center* Sep. 2001.

Zollman, Peter M. "Interactive Television", www.rtnda.org/resources/intnews/srttv.htm, 1-9.

* cited by examiner

INTERACTIVE CONTENT WITH ENHANCED NETWORK OPERATOR CONTROL

RELATED APPLICATIONS

This application is related to the following applications: U.S. Ser. No. 10/610,776 filed Jun. 30, 2003, U.S. Ser. No. 10/742,700 filed Dec. 19, 2003, U.S. Ser. No. 10/610,938, filed Jun. 30, 2003, U.S. Ser. No. 10/611,259 filed Jun. 30, 2003, U.S. Ser. No. 10/611,455 filed Jun. 30, 2003, and U.S. Ser. No. 10/611,453 filed Jun. 30, 2003.

FIELD OF THE INVENTION

The various embodiments of the invention disclosed herein relate generally to the field of interactive television. More particularly, these embodiments relate to providing enhanced network operator control.

BACKGROUND OF THE INVENTION

Advances in telecommunications and computing technology have led to the use of interactive television (TV) services on a large scale. Where such services are available, users are not only able to access television content by passively receiving it, but are also beginning to interact with the service providers by communicating requests and/or commands to the service providers. These requests and/or commands may be communicated to the service provider via the same path over which the programming services are provided or even via other paths.

Interactive television may be provided over any number of paths, including coaxial cable or optical fiber, hybrid fiber/coaxial, or any other suitable path that accommodates sufficient bandwidth for desired video channels as well as other telecommunications services. Content providers may include, for example, providers of over-the-air programming such as commercial television stations, cable programming such as weather, travel and entertainment channels, game channels, and other interactive services of various types.

Generally, TV service provides a user or user a variety of options such as: traditional broadcast and cable television programming; video services, such as pay-per-view (PPV), near video-on-demand (NVOD), video-on-demand (VOD), promo channels, electronic program guides, etc.; cable delivered PC-based services; and interactive services through the use of a combination of compression and digital video technologies. TV services may also provide menuing capabilities and upstream signaling from users to service providers.

The combination of broadcast and interactive applications over interactive TV (e.g., interactive content) creates a possible mode of communication in which a user, if informed of the availability of alternate interactive content relating to a subject matter of interest, may invoke the alternate content to investigate that subject matter more thoroughly and according to his or her own tastes. However, television viewers, who are accustomed to choosing at will between the available transmitted channels with instantaneous results, will expect to be informed of the alternate content in a convenient and timely manner and to pass from one medium to another seamlessly.

SUMMARY OF THE INVENTION

A method and apparatus are described that provide enhanced network operator control. According to one aspect of the present invention, a method comprises determining at a head-end and data center whether to inform one or more users of an interactive television service of available content, the one or more users connected with head-end and data center via a network. Responsive to determining to inform the one or more users of the available content, generating a hot key signal indicating availability and a location of the alternate content. The hot key signal is inserted into a content signal transmitted to the one or more users from the head-end and data center via the network.

Other features of the present invention will be apparent from the accompanying drawings and from the detailed description that follows.

BRIEF DESCRIPTION OF THE DRAWINGS

The appended claims set forth the features of embodiments of the invention with particularity. The invention, together with its advantages, may be best understood from the following detailed description taken in conjunction with the accompanying drawings of which:

DETAILED DESCRIPTION OF THE INVENTION

In the following description, for the purposes of explanation, numerous specific details are set forth in order to provide a thorough understanding. It will be apparent, however, to one skilled in the art that embodiments of the present invention may be practiced without some of these specific details. In other instances, well-known structures and devices are shown in block diagram form.

Embodiments of the present invention include various processes, which will be described below. The processes may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, Compact Disk Read-Only Memories (CD-ROMs), and magneto-optical disks, Read-Only Memories (ROMs), Random Access Memories (RAMs), Erasable Programmable Read-Only Memories (EPROMs), Electronically Erasable Programmable Read-Only Memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIGS. 1A-1D illustrate a television displaying a picture containing a hot key for informing a user of available alternate content and redirecting the user to the alternate content responsive to selection of the embedded hot key according to one embodiment of the present invention. These figures represent respectively a process of viewing content, receiving a hot key, accepting a hot key, and redirecting to alternate content.

Figure 1A:
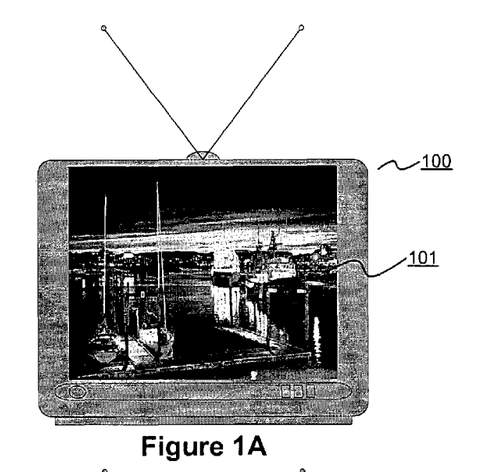
FIGS. 1A-1D illustrate a television displaying a picture containing a hot key for informing a user of available alternate content and redirecting the user to the alternate content responsive to selection of the embedded hot key according to one embodiment of the present invention.

Specifically, FIG. 1A illustrates an example of viewing content. Here, a video program 101 is being displayed on television 100. Alternatively, a user may be viewing other types of interactive TV content such as pay-per-view video content, interactive games, etc.

Figure 1B:
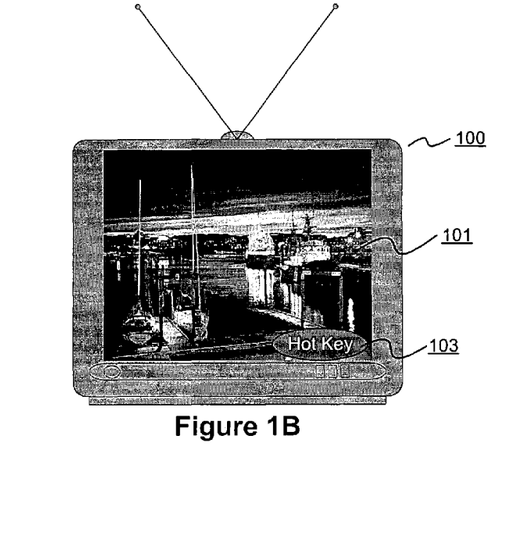

FIG. 1B illustrates an example of receiving a hot key. In this example, the user is tuned to the same video program 101 on television 100 as in the previous example of FIG. 1A. However, in this example an icon 103 or other graphic has been displayed to indicate to the user that a hot key has been received. The hot key indicates that alternate content is available for the user's consumption. According to one embodiment of the present invention, the alternate content may be in the form of another video program with content related to the video program 101 being viewed by the user.

Figure 1C:
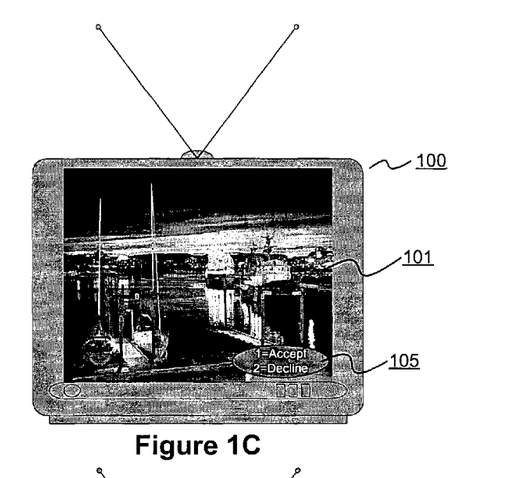

FIG. 1C illustrates an example of accepting a hot key. In this example, the user is tuned to the same video program 101 as in FIGS. 1A and 1B. Icon 105, displayed to indicate to the user that a hot key has been received, now indicates a manner in which the user may accept or decline the alternate content. In this example, icon 105 indicates that the user may press 1 to accept the alternate content or 2 to decline the alternate content.

Of course, other methods of accepting or declining the alternate content may be used. For example, different single or even multiple buttons on a remote control may be pressed by the user to accept or decline the alternate content. According to one embodiment, a single "hot key button" may be present on the user's remote control that may be pressed by the user whenever a hot key icon is present on the television display. Pressing the hot key button may be a manner in which the user accepts the alternate content and is redirected to that content without further interaction from the user. According to another embodiment, the user may decline the alternate content by taking no action at all. That is, after some time period during which no action is taken by the user to accept the alternate content, the hot key may simply time out and expire. Various other methods of accepting or declining the alternate content may also be used.

Figure 1D:
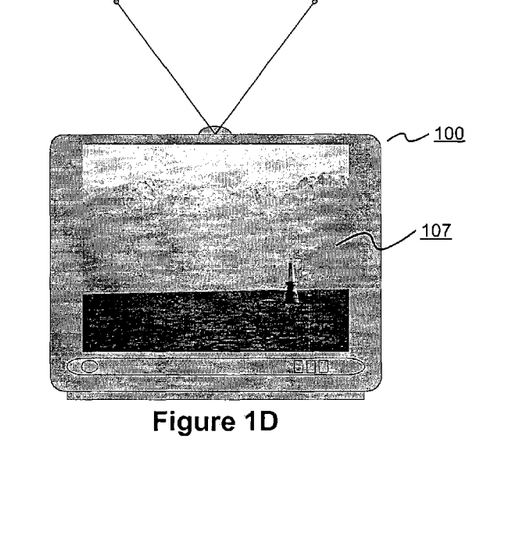

Regardless of the exact operation used to accept the alternate content, FIG. 1D illustrates redirecting a user to alternate content responsive to the hot key being accepted. According to one embodiment of the present invention, the alternate content may be another video program with content related to the video program 101 being viewed by the user. Therefore, television 100 in FIG. 1D illustrates an alternate video program 107 being displayed. According to one embodiment of the present invention, the alternate video program 107 may present content related to the original content the user was viewing. For example, if the user was viewing a television program related to travel, the alternate video program may also be related to travel.

According to yet another embodiment of the present invention, the alternate video program may be commercial in nature. For example, the television program may be related to sports. In such a case, the alternate video program may be a pay-per-view sporting event of the same type or an advertisement for an upcoming pay-per-view event. In another example, the alternate video program may be an "infomercial" selling merchandise related to some aspect of the original video content.

Therefore, content providers and/or service providers may be able to sell hot keys just as they currently sell time for commercial spots. For example, a provider of pay-per-view video content may wish to purchase from a content provider a hot key that redirects users to his content or an advertisement of upcoming events during a television program related to that content. Alternatively, content providers may charge users to receive a hot key service or even to block some or all hot key signals. Content providers and/or service providers may thus be able to realize an additional source of revenue.

As will be described below, a system over which interactive television signals containing embedded hot key signals may be transmitted according to various embodiments of the present invention may be implemented over different types of networks. These different types of networks include, but are not limited to, cable, satellite, Fiber-to-the-Curb (FTTC), Fiber-to-the-House (FTTH), Very high speed Digital Subscriber Line (VDSL), and others.

Figure 2:
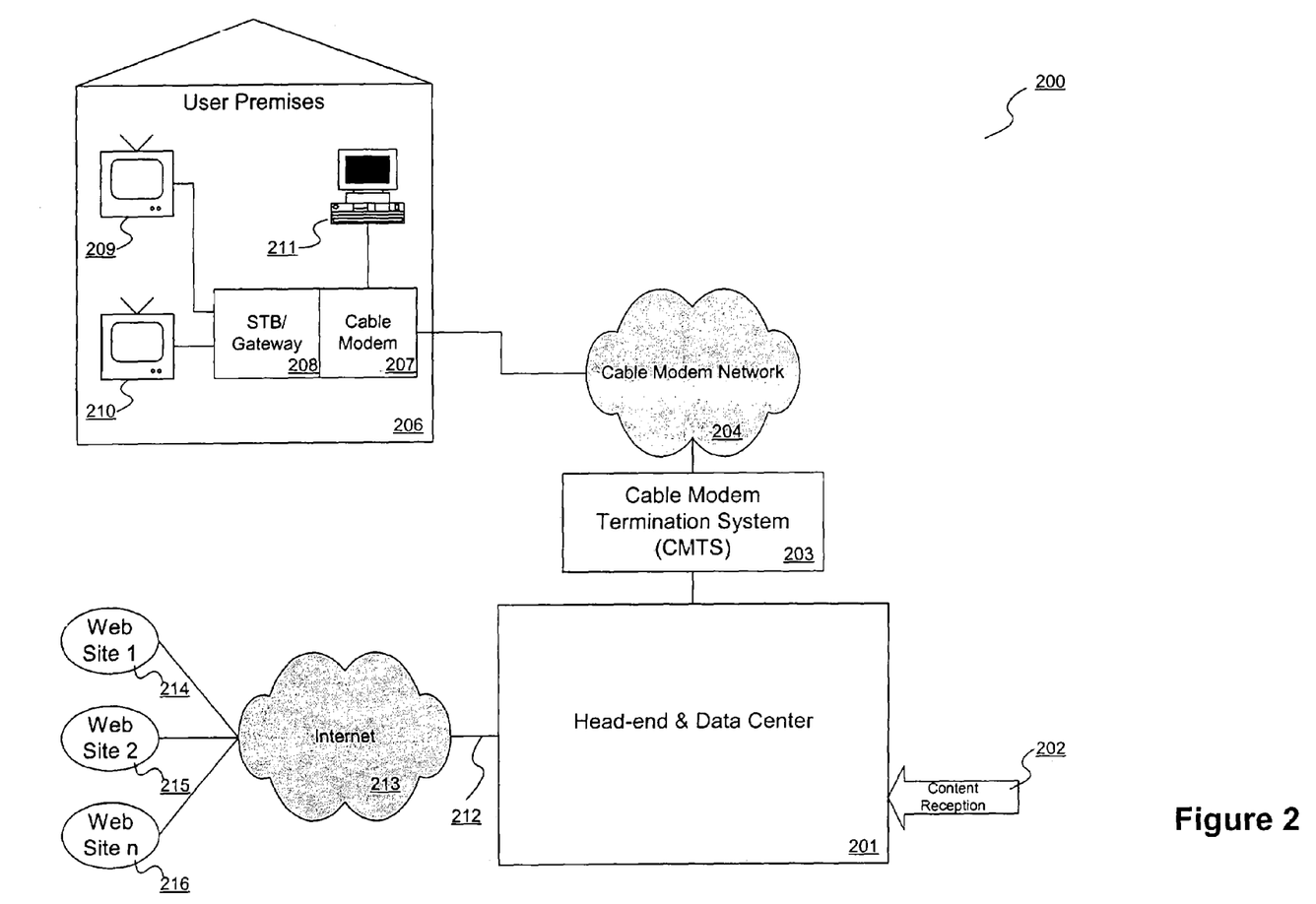
FIG. 2 is a block diagram illustrating an exemplary network over which interactive television signals containing embedded hot key signals may be transmitted according to one embodiment of the present invention.

FIG. 2 is a block diagram illustrating an exemplary network over which interactive television signals containing embedded hot key signals may be transmitted according to one embodiment of the present invention. This example illustrates, at a high-level, an architecture of a service provider's system 200 that includes head-end and data center 201, Cable Modem Termination System (CMTS) 203, cable modem network 204, and user premises 206 that also contains cable modem 207, Set Top Box (STB)/Gateway 208, one or more televisions 209 and 210, and possibly other devices such as personal computer (PC) 211.

An interactive TV service provider typically operates and maintains a head-end and data center 201 equipped to receive signals 202 from one or more content providers. Content providers may be any original or secondary source of programming or information generally including, for example, interactive or non-interactive over-the-air programming such as commercial television stations, cable programming such as weather, travel and entertainment channels, game channels, and other interactive services of various types. Head-end and data center 201, after receiving content from one or more content providers, may then transmit the interactive content to users premises 206. Further details of the hardware comprising the head-end and data center 201 as well as the processing performed therein will be discussed below with reference to FIGS. 3 and 4.

According to one embodiment of the present invention, hot key signals indicating the availability of alternate content may be provided to head-end and data center 201 along with and embedded in interactive TV signals 202 from the content providers. For example, the hot key signals may be generated at the content provider's location by an operations team when preparing and scheduling content for transmission to various service providers. As will be discussed below, interactive TV signals with these embedded hot key signals are transmitted from head-end and data center 201 and are received and used by STB/gateway 208 or PC 211 at user premises 206 to inform the user of the availability of alternate content and to guide the user to this content if he chooses to accept it. Details of the hot key signals will be discussed below with reference to FIG. 5.

According to another embodiment of the present invention, hot key signals indicating the availability of alternate content may be generated at head-end and data center 201. For example, the hot key signals may be generated at head-end and data center 201 by an operations team when preparing and scheduling content for transmission to users. As will be discussed below, these embedded hot key signals are transmitted from head-end and data center 201 and are received and used by STB/gateway 208 or PC 211 at user premises 206 to inform the user of the availability of alternate content and to guide the user to this content if he chooses to accept it.

In the example illustrated in FIG. 2, a signal carrying interactive TV content is transmitted from head-end and data center 201 through CMTS 203 and onto cable modem network 204. Typically, transmissions over cable modem network 204 may be made in a digital form. For example, the content may be transmitted as a Motion Pictures Experts Group Standard 2 (MPEG-2) data stream using a network protocol such as Internet Protocol (IP). Therefore, the content may be transmitted from head-end and data center 201 as IP data packets or in another similar format. One possible example of such a packet will be discussed below with reference to FIG. 5.

Regardless of the format of the transmission, a signal carrying the interactive TV content is received at user premises 206 via cable modem 207. Connected with cable modem 207 may be some form of terminal device. In the example illustrated by FIG. 2, two possible types of terminal devices, STB/Gateway 208 and PC 211 are shown. The terminal device, STB, Gateway, PC or other device, performs functions such as exchanging messages (including video-related data) over a network with head-end and data center 201, receiving messages from a user input device, such as a hand-held remote control unit or keyboard, translating video signals from a network-native format into a format that can be used by televisions 209 and 210 or other display devices, and providing a video signal to televisions 209 and 210 or other display devices. STB/Gateway 208 and PC 211 may also be capable of performing other functions, such as inserting alphanumeric or graphical information into the video stream in order to "overlay" that information on the video image, providing graphic or audio feedback to a user, or routing a traditional broadcast signal to a viewing device to which another STB is connected. Additional details of the hardware of STB/Gateway 208 and the processing performed therein will be discussed below with reference to FIGS. 6 and 7.

In use, STB/Gateway 208 or PC 211 may receive hot key signals embedded in the interactive TV signals by either the content providers or the service provider. STB/Gateway 208 or PC 211 may then notify the user of available alternate content as discussed above with reference to FIG. 1. STB/Gateway 208 or PC 211 may then receive some form of user feedback indicating that the user accepts or declines the alternate content. If the user accepts the alternate content, STB/Gateway 208 or PC 211 may then redirect the user to this alternate content as will be discussed further below with reference to FIG. 7.

According to one embodiment of the present invention, head-end and data center may also be connected with the Internet 213 or other network via a high-speed connection 212 such as a fiber optic connection to provide access to a number of web sites 214-216. Through this connection 212, head-end and data center 201 may supply alternate content to users from one or more of the number of web sites 214-216.

Figure 3:
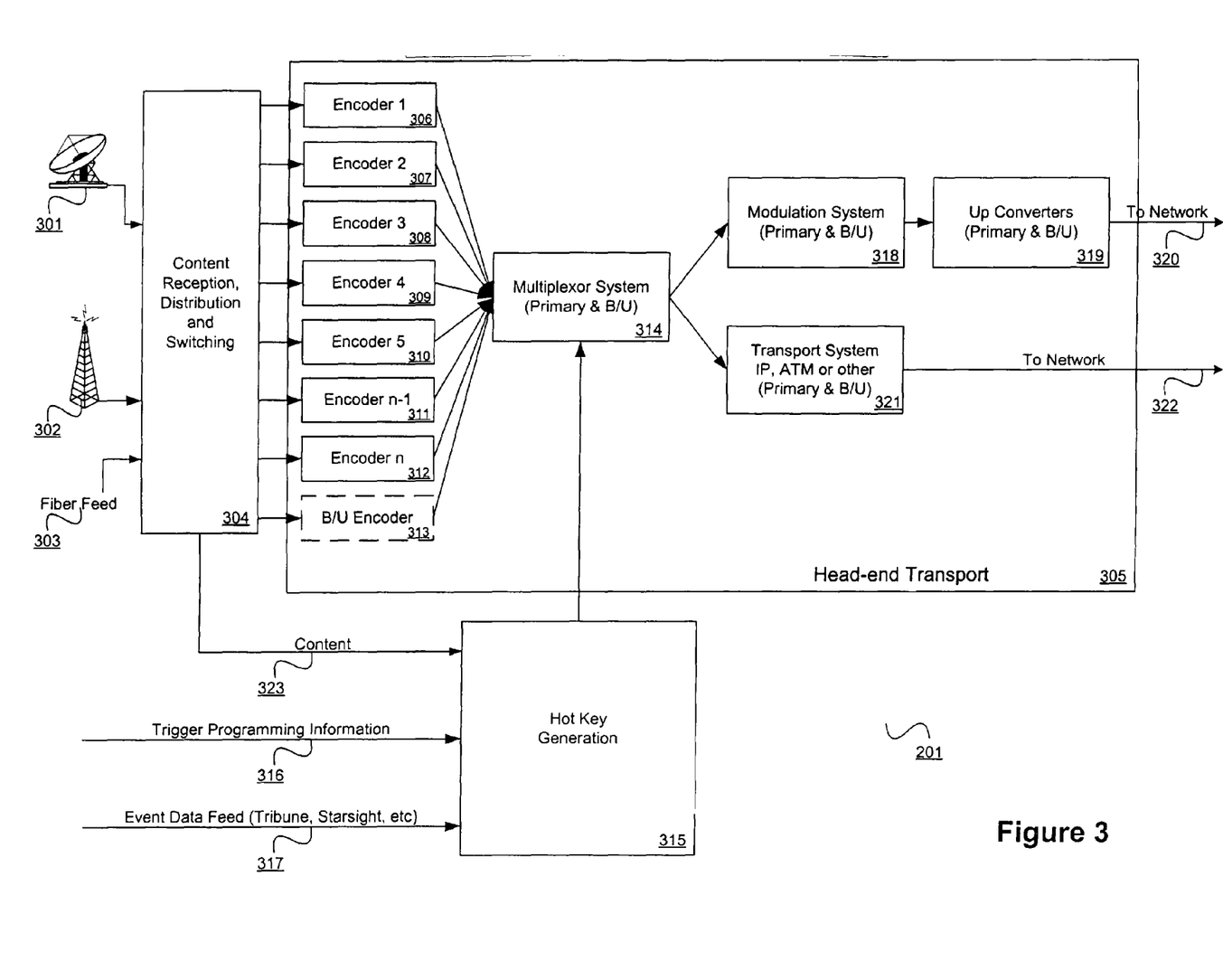
FIG. 3 is a block diagram of a head-end and data center system where hot key signals may be added to a transmitted signal according to one embodiment of the present invention.

FIG. 3 is a block diagram illustrating a head-end and data center system where hot key signals may be added to a transmitted signal according to one embodiment of the present invention. This example illustrates head-end and data center system 201 comprising content reception, distribution, and switching portion 304, head-end transport portion 305, and hot key generation system 315.

Content reception, distribution, and switching portion 304 is connected with one or more of satellite receiver 301, over the air transmission receiver 302, fiber optical feed 303, and other types of links (not shown) to receive signals from one or more content providers. Content reception, distribution, and switching portion 304 comprises equipment that that is commonly used to receive transmitted signals, demodulate the transmitted signals to separate the content signals from a carrier signal if necessary, distribute and arrange the content from the content providers to fit a programming schedule of the service provider, and provide switching of these signals between the various components of the head-end and data center 201.

Head-end transport portion 305 comprises a plurality of encoders 306-312, optional back-up encoder 313, multiplexor system 314, modulation system 318, up converters 319, and transport system 321. Encoders 305-312 and optional back-up encoder 313 receive interactive TV content signals from content reception, distribution, and switching portion 304 and encode the content signals into any of a variety of well known formats such as Motion Pictures Experts Group Standard 2 (MPEG-2), Motion Pictures Experts Group Standard 4 (MPEG-4), DivX, or any other format. Encoders 305-312 and optional back-up encoder 313 each provide an individual encoded data stream representing the content signal of a single channel to multiplexor system 314.

Hot key generation system 315 is also connected with multiplexor system 314 of head-end transport 305. Hot key generation system 315 receives content 323 from content reception, distribution, and switching portion 304, trigger programming information 316, and event data feed 317. Trigger programming information 316 provides an indication of the time, date, etc. that given content will be played out. Event data feed 317 provides live content rather than content that is programmed and played out at a scheduled time. Using content 323, trigger programming information 316, and event data feed 317 hot key generation system 315 generates hot key signals associated with content to be transmitted from head-end and data center 201 and outputs the hot key signals to multiplexor system 314. Exemplary processes for generating hot key signals as may be performed by hot key generation system 315 will be discussed below with reference to FIG. 4.

Multiplexor system 314 may comprise a primary as well as an optional back-up multiplexor. Multiplexor system 314 combines the encoded content signals from encoders 305-312 and optional back-up encoder 313 and hot key signals from hot key generation system 315 to provide an output data stream. The output stream of multiplexor system 314 comprises the individual encoded data streams representing the content signals of the individual channels as well as any associated hot key signals.

The output stream of multiplexor system 314 may be applied to a modulation system 318. Modulation system 318 may comprise a primary as well as an optional back-up modulator. Modulation system 318 uses the output data stream of multiplexor system 314 to modulate a carrier frequency for transmission from the head-end system 201.

Modulation system 318 supplies the modulated carrier signal to up converters 319. Up converters 319 may comprise primary as well as optional back-up converters. Additionally, up converters 319 may comprise multiple stages of converters. The function of up converters 319 is to increase the modulated carrier frequency to a range that is suitable for transmission. Up converters 319 then transmit the modulated carrier signal from head-end and data center 201 via network 320 to users.

Optionally, or in addition to modulation system 318, the output of multiplexor system 314 may be applied to transport system 321 that may comprise a primary as well as an optional back-up transport system. The function of the transport system 321 is to prepare the output stream of multiplexor system 314 for transmission over network 322. That is, transport system 321 places the output stream of multiplexor system 314 into a format and protocol appropriate for network 322. For example, the output stream of multiplexor system may be placed into Internet Protocol (IP) packets or placed into an Asynchronous Transfer Mode (ATM) channel by transport system 321.

Figure 4:
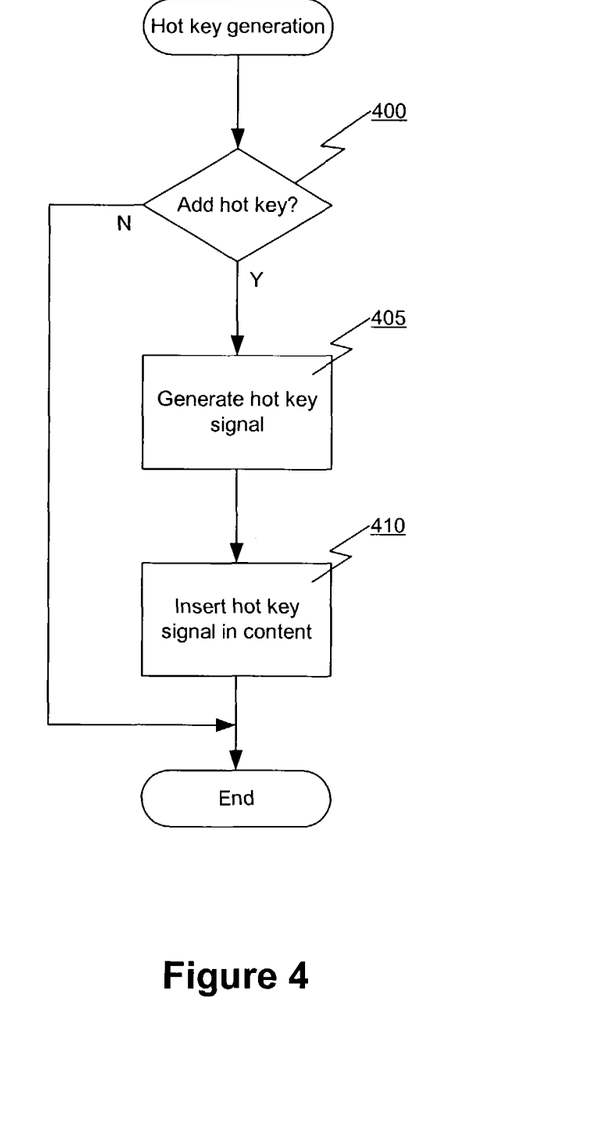
FIG. 4 is a flowchart illustrating head-end and data center processing for adding hot key signals to a transmitted signal according to one embodiment of the present invention.

FIG. 4 is a flowchart illustrating head-end and data center processing for adding hot key signals to a transmitted signal according to one embodiment of the present invention. This process may be performed by a system such as the hot key generation system of the head-end and data center described above with reference to FIG. 3 or any other system with similar capabilities.

First, at decision block 400, the system determines whether a hot key signal should be added to the current content. This determination may be made at head-end and data center 201. For example, hot key generation portion 315 may perform a search of electronic program guide or other programming information to find related content. If head-end and data center 201 is connected to the Internet, hot key generation portion 315 may extend this search to web sites. That is, a search of Internet sites may be performed based on information related to content detected from an electronic program guide or from another search. For example, a search of electronic program guide information may detect a professional football game including the names of the teams. A search may then be done on the rest of the electronic program guide for another professional football game or other sports. Additionally, a search of Internet sites may be done for sites related to professional football or the teams involved.

Alternatively, hot key generation portion may be triggered to generate a hot key signal by information or operation performed by human operators. For example, an operation team, generating a programming schedule may at the same time identify related content and thereby indicate that a hot key signal should be generated for that content.

If a hot key signal is to be added to the current content, the hot key signal may be generated at processing block 405. According to one embodiment of the present invention, the hot key signal may comprise a special purpose Internet Protocol (IP) packet as described below with reference to FIG. 5. Alternatively, the hot key signal may be any other type of digital signal or packet suitable for transmission over the type of network being used and capable of carrying information similar to that shown in FIG. 5.

Finally, at processing block 405, the hot key signal is inserted into the content signal. That is, the hot key IP packet or other signal is multiplexed with the content data stream as described above with reference to FIG. 3.

According to one embodiment of the present invention, alternate content may be pre-loaded or cached on the users equipment prior to transmission of the hot key signal. That is, the head-end and data center may first send available alternate content to the user's equipment such as an STB or gateway. The user's equipment may cache the alternate content on a hard drive or other large capacity storage device. Once the alternate content is cached, a hot key informs the user of the availability of the content. The user may then view the content, reject the content, choice to view the content at a later time, or other possible options.

Figure 5:
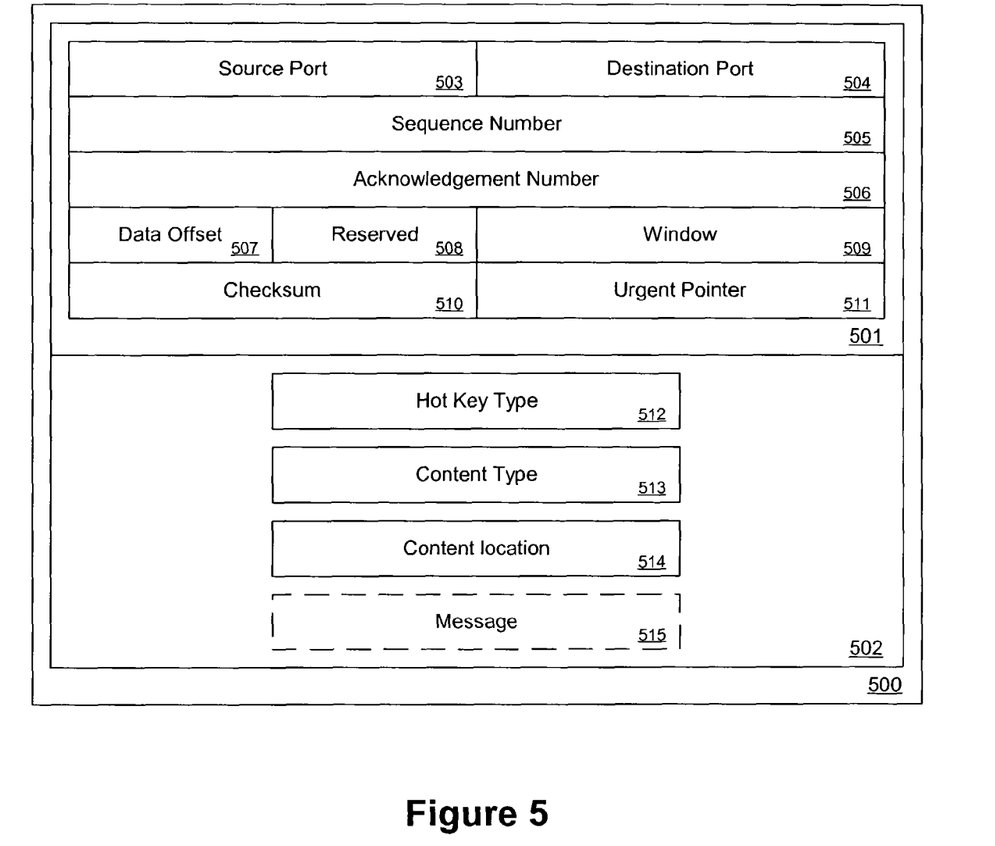
FIG. 5 is a diagram illustrating one possible format for a hot key data packet according to one embodiment of the present invention.

FIG. 5 is a diagram illustrating one possible format for a hot key data packet according to one embodiment of the present invention. This example illustrates an IP data packet 500. The IP data packet includes a header 501 and a body 502.

Header 501 includes a number of fields 503-511 that are typically found in IP data packets. These fields include a source port 503, a destination port 504, a sequence number 505, an acknowledgement number 506, a data offset 507, a reserved field 508, a window field 509, checksum data 510, and an urgent pointer 511. It should be noted that such an IP data packet may be sent to multiple address using IP multicasting. Multicasting therefore allows efficient transmission of the hot key signals from the head-end and data center to users.

Body 502 may also include a number of fields 512-515. These fields may include a hot key type 512, a content type 513, a content location 514, and optionally a message field 515. In various applications, the number of fields used, size of the fields, type of data presented, format of the data, content of the fields, etc. may vary. For example, in some cases not all of the fields presented here may be used. In other cases, additional data may be presented such as additional graphical or textual information. Additionally, the data may be presented in a wide variety of formats such as plain American Standard Code for Information Interchange (ASCII) text, other binary representations or even encrypted.

Regardless of format, hot key type field 512 may represent the type of hot key signal being used. For example, the hot key signal represented by IP data packet 500 may indicate that alternate content is available on another channel or on a web site. Alternatively, the hot key signal may indicate that alternate content is available to be cached on the user's terminal device.

Content type field 513 may represent the type, genre, or other details about the alternate content. For example, this field 513 may be used to indicate that the alternate content is a sporting event or movie. Of course, additional details may also be included. For example, the field 513 may indicate that the alternate content is an action movie and name the actors and director. This information may be used by the user's terminal device to judge the relevance of the hot key signal to the user as will be discussed below.

Content location field 514 may indicate where the alternate content is located. For example, this field 514 may indicate another channel, a web site URL or indicate that the content has been cached on the user's terminal device.

Optional message field 515 may include additional textual or graphical information regarding the hot key or the alternate content. For example, the message field 515 may contain a text message to be displayed to the user providing details of the alternate content. This message may be presented to the user automatically or at his option to help the user decide whether to accept or decline the hot key.

Figure 6:
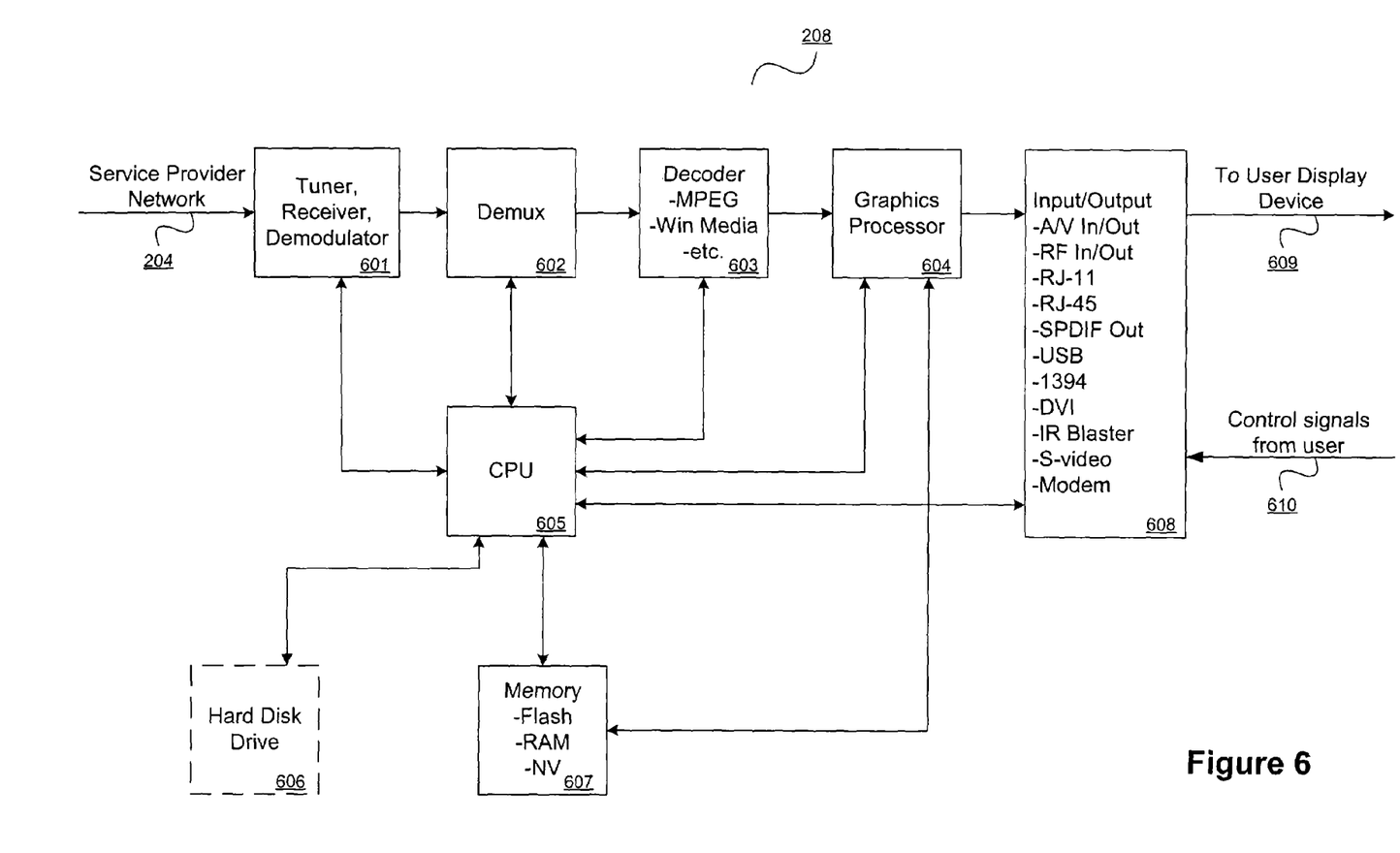
FIG. 6 is a block diagram of a user side system to redirect a user to alternate content responsive to selection of an embedded hot key according to one embodiment of the present invention.

FIG. 6 is a block diagram illustrating a user side system to redirect a user to alternate content responsive to selection of an embedded hot key according to one embodiment of the present invention. As discussed above, the user side system may vary significantly. The user side system comprising a terminal device, STB, Gateway or similar device, performs functions such as exchanging messages (including video-related data) over a network with head-end and data center, receiving messages from a user input device, such as a hand-held remote control unit, translating video signals from a network-native format into a format that can be used by televisions or other display devices, providing a video signal to televisions or other display devices, and other functions.

The functionality of the user side system may reside in a stand-alone device, literally a box that can be placed on, or at least near, the television, that is similar in outward form to conventional devices for receiving cable programs. The user side system functionality could alternatively be performed by hardware resident elsewhere, such as within the television or display console, or by any suitably equipped terminal device. Since the hardware may be proprietary to the service provider and may generally be a physically independent device, the term set top box is used here, but any type of terminal device with similar functionality may be used.

In the example illustrated in FIG. 6, the user side system comprises an STB 208. STB 208 comprises tuner, receiver, demodulator 601, demultiplexor 602, decoder 603, graphics processor 604, central processing unit (CPU) 605, optional hard disk drive 606 or other mass storage device, memory 607, and various possible inputs and outputs 608.

Tuner, receiver, demodulator 601 receives signals from the service provider network 204 over any of a variety of media as discussed above. Specifically, tuner, receiver, demodulator 601 receives signals of a frequency band to which it is tuned and demodulates the signals to remove content signals from a carrier signal if any. Demodulated content signals are then supplied by tuner, receiver, and demodulator 601 to demultiplexor 602.

Demultiplexor 602 receives the demodulated content signals from tuner, receiver, demodulator 601 and separates the content into multiple data streams representing various channels. The multiple data streams are then supplied as an input to decoder 603.

Decoder 603 receives the multiple data streams from demultiplexor 602 and decodes or decompresses the data streams using an appropriate algorithm. For example, if the head-end and data center compressed the video signals into an MPEG-2 data stream, decoder 603 will decode the MPEG-2 data stream from demultiplexor 602 to form a standard video signal. The video signal from decoder 603 is then supplied to graphics processor 604.

Graphics processor 604 receives the decoded video signals from decoder 603 and processes the video signals to reduce noise, provide amplifications, etc. Processed video signals from graphics processor 604 are supplied to input/output module 608. Input/output module 608 may provide a variety of possible output types. For example, outputs may include but are not limited to Audio/Video (A/V), Radio Frequency (RF), Sony/Phillips Digital Interface (SPDIF), Universal Serial Bus (USB), and others.

Input/output module 608 also receives control signals from the user. These control signals are typically InfraRed (IR) or Radio Frequency (RF) signals from a remote control unit. Control signals from the user are then fed back from input/output module 608 to Central Processing Unit (CPU) 605.

CPU 605 executes instructions stored in memory 607. Memory 607 may comprise A Random Access Memory (RAM) such as flash memory, or other non-volatile memory. The instructions stored in memory 607, when executed by CPU 605 cause CPU 605 to perform various functions such as controlling the various elements of STB 208, receiving hot key signals, and switching to alternate content responsive to selection of an embedded hot key as will be described below with reference to FIG. 7.

Generally, a hot key signal will be received at tuner, receiver, and demodulator 601 along with and embedded in content signals from the head-end and data center and transmitted over service provider network 204. CPU 605 monitors the demultiplexed data streams from demultiplexor 602 for the presence of relevant hot key signals.

STB 208 may also contain an optional hard disk drive 606 or other mass storage device. Hard disk drive 606 allows STB 208 to cache alternate content for later viewing by the user. If CPU 605 detects a hot key signals instructing content to be cached, the demultiplexed data stream from demultiplexor 602 may be saved on hard disk drive 606. The still compressed content is stored on hard disk drive 606 until the user chooses to view it. Once the user chooses to view the cached content, CPU 605 may retrieve the content from hard disk drive 606 and provide the compressed data stream to be decoded by decoder 603, processed by graphics processor 604, and output through input/output module 608.

Figure 7:
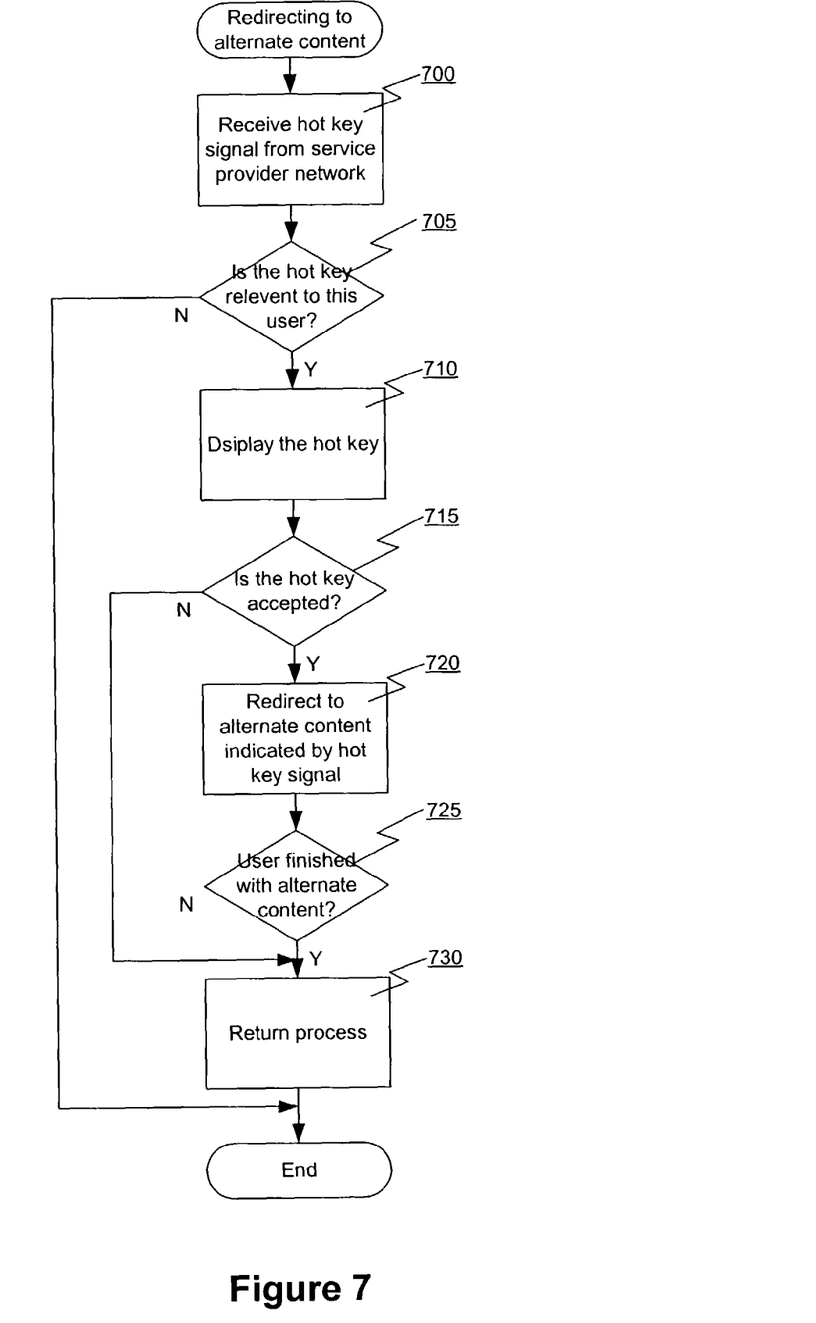
FIG. 7 is a flowchart illustrating processing on a user side system for redirecting a user to alternate content responsive to selection of an embedded hot key according to one embodiment of the present invention.

FIG. 7 is a flowchart illustrating processing on a user side system for redirecting a user to alternate content responsive to selection of an embedded hot key according to one embodiment of the present invention. This process may be performed by a system such as described above with reference to FIG. 6 or any other system with similar capabilities.

First, at processing block 700, the system receives a hot key signal from the service provider's network. As discussed above, the hot key signal may be in the form of a specialized IP packet or another type of signal embedded in the content signal from the service provider.

At decision block 705 a determination is made as to whether the hot key signal is relevant to the particular user. Since numerous hot key signals may be transmitted at any particular time, the signals may be filtered before being presented to the user. Such filtering may be based on any number of possible algorithms and criteria. For example, only hot key signals related to a channel that is presently being viewed may be considered relevant. Another criteria for determining relevance of a hot key signal may be choices of content types or genres which have been selected by the user. Regardless of the algorithm or criteria used to judge relevance, if the hot key signal is determined at decision block 705 to not be relevant, no further processing is performed.

If the hot key signal is determined at decision block 705 to be relevant to the user, a hot key icon or other indication is displayed to the user at processing block 710. As mentioned above, this indication may be in the form of an icon placed on the screen, a text message, a tone or even a verbal alert. Regardless of the exact form, some indication is given to the user that a hot key has been received.

At decision block 715 a determination is made as to whether the user has accepted the hot key. As discussed above, the user may use any of a variety of means to indicate acceptance of the hot key. For example, different single or even multiple buttons on a remote control may be pressed by the user to accept or decline the alternate content. According to one embodiment, a single "hot key button" may be present on the user's remote control that may be pressed by the user whenever a hot key icon is present on the television display.

Regardless of the exact means of accepting or declining the hot key, if it is determined at decision block 715 the user did not accept the hot key, no further processing is performed.

If, at decision block 715, the user accepts the hot key, the user is redirected to the alternate content at processing block 720.

At decision block 725 a determination is made as to whether the user has finished consuming the alternate content. This determination may be based on any of a variety of possible criteria. For example, the user may press a button or series of buttons on a remote control to indicate that he has finished viewing the presented material. Alternatively, the user may use a mouse or other pointing device of a remote control to select a graphic on the display to indicate that he has finished viewing the presented material.

Once a determination is made at decision block 725 that the user is finished with the alternate content, a return process is entered at processing block 730. This return process may include simply returning the user to the previous content. Alternatively, the return process may comprise presenting to the user other available content based on other hot key signals. Another alternative may include presenting a user with a number of choices of how to proceed.

What is claimed is:

1. A method comprising:
   determining at a data center whether to inform a user of an interactive television service of alternate content, wherein a user device of the user is connected with the data center via a network;
   responsive to determining to inform the user of the alternate content, generating a hot key signal indicating availability of the alternate content; and
   inserting the hot key signal into a content signal transmitted to the user device from the data center via the network;
   wherein the determining is independent of any request by the user for the alternate content, but based at least in part on a search for alternate content having subject matter that is related to subject matter of content being viewed by the user when the search is conducted.

2. The method of claim 1, wherein determining at the data center whether to inform the user of the interactive television service of the alternate content is based on results of a search of programming information.

3. The method of claim 2, wherein determining at the data center whether to inform the user of the interactive television service of the alternate content further comprises performing a search of one or more web sites.

4. The method of claim 3, wherein performing the search of the one or more web sites comprises using the results of the search of the programming information.

5. The method of claim 1, wherein determining at the data center whether to inform the user of the interactive television service of the alternate content is based on information received during generation of programming information.

6. The method of claim 1, wherein the hot key signal comprises an internet protocol data packet, the internet protocol data packet having a header portion and a body portion, the body portion having a data field indicating a location of the alternate content.

7. The method of claim 6, wherein the internet protocol data packet is transmitted from the data center as an internet protocol multicast to the user device via the network.

8. A data center comprising:
   a hot key generation portion to determine whether to inform a user of an interactive television service of alternate content, wherein a user device of the user is connected with the data center via a network, and to generate a hot key signal indicating availability of the alternate content responsive to determining to inform the user of the alternate content;
   a multiplexor system to insert the hot key signal into a content signal; and
   a transport system to transmit the content signal and the hot key signal to the user device from the data center via the network;
   wherein the hot key generation portion determines whether to inform the user of the alternate content independent of any request by the user for the alternate content, but based at least in part on a search for alternate content having subject matter that is related to subject matter of content being viewed by the user when the search is conducted.

9. The data center of claim 8, wherein the hot key generation portion comprises means for determining whether to inform the user of the interactive television service of the alternate content based on results of a search of programming information.

10. The data center of claim 9, wherein the hot key generation portion comprises means for determining whether to inform the user of the interactive television service of the alternate content by performing a search of one or more web sites.

11. The data center of claim 10, wherein the hot key generation portion further comprises means for performing the search of the one or more web sites using the results of the search of the programming information.

12. The data center of claim 8, wherein the hot key generation portion comprises means for determining whether to inform the user of the interactive television service of the alternate content based on information received during generation of programming information.

13. The data center of claim 8, wherein the hot key signal comprises an internet protocol data packet, the internet protocol data packet having a header portion and a body portion, the body portion having a data field indicating a location of the alternate content.

14. The data center of claim 13, wherein the internet protocol data packet is transmitted from the data center as an internet protocol multicast to the user device via the network.

15. A machine-readable storage device having stored thereon a series of instructions, the instructions, when executed by a processor, cause the processor to:
   determine at a data center whether to inform a user of an interactive television service of alternate content, wherein a user device of the user is connected with the data center via a network;
   responsive to determining to inform the user of the alternate content, generate a hot key signal indicating availability of the alternate content; and
   insert the hot key signal into a content signal transmitted to the user device from the data center via the network,
   wherein the instructions cause the processor to determine whether to inform the user of the alternate content independent of any request by the user for the alternate content, but based at least in part on a search for alternate content having subject matter related to subject matter of content being viewed by the user when the search is conducted.

16. The machine-readable storage device of claim 15, wherein the instructions cause the processor to determine whether to inform the user of the interactive television service of the alternate content based on results of a search of programming information.

17. The machine-readable storage device of claim 16, wherein the instructions cause the processor to determine whether to inform the user of the interactive television service of the alternate content based further on results of a search of one or more web sites.

18. The machine-readable storage device of claim 17, wherein the instructions cause the processor to perform the search of the one or more web sites using the results of the search of the programming information.

19. The machine-readable storage device of claim 15, wherein the instructions cause the processor to determine whether to inform the user of the interactive television service of the alternate content based on information received during generation of programming information.

20. The machine-readable storage device of claim 15, wherein the hot key signal comprises an internet protocol data packet, the internet protocol data packet having a header portion and a body portion, the body portion having a data field indicating a location of the alternate content.

21. The machine-readable storage device of claim 20, wherein the internet protocol data packet is transmitted from the data center as an internet protocol multicast to the user device via the network.

* * * * *